US010730185B2

(12) United States Patent
Walters et al.

(10) Patent No.: US 10,730,185 B2
(45) Date of Patent: Aug. 4, 2020

(54) SYSTEMS AND METHODS FOR INSPECTING, CLEANING, AND/OR REPAIRING ONE OR MORE BLADES ATTACHED TO A ROTOR OF A GAS TURBINE ENGINE USING A ROBOTIC SYSTEM

(71) Applicant: General Electric Company, Schenectady, NY (US)

(72) Inventors: Zachary L. Walters, Woodruff, SC (US); Maxwell E. Miller, Simpsonville, SC (US); Robert E. Huth, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 343 days.

(21) Appl. No.: 15/964,657

(22) Filed: Apr. 27, 2018

(65) Prior Publication Data
US 2019/0308319 A1    Oct. 10, 2019

Related U.S. Application Data

(60) Provisional application No. 62/655,664, filed on Apr. 10, 2018.

(51) Int. Cl.
*G06F 17/00* (2019.01)
*B25J 9/16* (2006.01)
(Continued)

(52) U.S. Cl.
CPC ............. *B25J 9/1664* (2013.01); *B23P 6/002* (2013.01); *B25J 9/0084* (2013.01); *B25J 9/0093* (2013.01);
(Continued)

(58) Field of Classification Search
CPC ...... B25J 9/1664; B25J 9/0084; B25J 9/0093; B25J 11/005; B23P 6/002; F01D 25/002;
(Continued)

(56) References Cited

U.S. PATENT DOCUMENTS 4,803,639 A    2/1989  Steele et al.
5,275,052 A *  1/1994  Luttrell .............. G01N 29/0645
                                                              73/619
(Continued)

FOREIGN PATENT DOCUMENTS

CN    103611709 B    8/2016
EP    2 335 843 A2   6/2011
(Continued)

OTHER PUBLICATIONS

Extended European Search Report, EP 19166619.7, dated Aug. 26, 2018 (18 pp.).

*Primary Examiner* — Ronnie M Mancho
(74) *Attorney, Agent, or Firm* — Eversheds Sutherland (US) LLP

(57) ABSTRACT

A system for inspecting, cleaning, and/or repairing one or more blades attached to a rotor of a gas turbine engine. The system includes a track disposed adjacent to the rotor, a mechanical arm moveable along the track, a number of tools attachable to the mechanical arm, and a controller configured to control a position of at least one of the tools that is attached to the mechanical arm about the one or more blades.

20 Claims, 9 Drawing Sheets

(51) Int. Cl.
*B23P 6/00* (2006.01)
*B25J 9/00* (2006.01)
*B25J 11/00* (2006.01)
*F01D 25/28* (2006.01)
*F04D 29/64* (2006.01)
*F01D 25/00* (2006.01)

(52) U.S. Cl.
CPC ............ *B25J 11/005* (2013.01); *F01D 25/002* (2013.01); *F01D 25/28* (2013.01); *F01D 25/285* (2013.01); *F04D 29/644* (2013.01); *F05D 2230/72* (2013.01); *F05D 2230/80* (2013.01); *F05D 2260/80* (2013.01); *F05D 2260/83* (2013.01); *F05D 2260/95* (2013.01); *F05D 2270/8041* (2013.01); *Y10S 901/07* (2013.01); *Y10S 901/08* (2013.01); *Y10S 901/41* (2013.01)

(58) Field of Classification Search
CPC ...... F01D 25/28; F01D 25/285; F04D 29/644; F05D 2230/72; F05D 2230/80; F05D 2260/80; F05D 2260/83; F05D 2260/95; F05D 2270/8041; Y10S 901/07; Y10S 901/08; Y10S 901/41
USPC ........................................................ 700/248
See application file for complete search history.

(56) References Cited

U.S. PATENT DOCUMENTS

| | | | |
|---|---|---|---|
| 6,784,662 B2 | 8/2004 | Schlicker et al. | |
| 7,049,811 B2 | 5/2006 | Schlicker et al. | |
| 7,322,250 B1 * | 1/2008 | Discenzo | G01L 1/241 |
| | | | 73/800 |
| 8,490,749 B2 * | 7/2013 | Teichert | E04G 3/30 |
| | | | 182/187 |
| 9,217,999 B2 | 12/2015 | Domke et al. | |
| 9,538,677 B2 | 1/2017 | Coombs et al. | |
| 9,733,195 B2 | 8/2017 | Colletti | |
| 9,838,442 B2 | 12/2017 | Soorianarayanan et al. | |
| 10,581,974 B2 * | 3/2020 | Sustaeta | G05B 13/0285 |
| 10,621,717 B2 * | 4/2020 | Wang | G06K 9/00744 |
| 10,657,735 B2 * | 5/2020 | Tucker | B64D 45/00 |
| 2002/0128790 A1 | 9/2002 | Woodmansee | |
| 2003/0071615 A1 | 4/2003 | Schlicker et al. | |
| 2004/0232911 A1 | 11/2004 | Schlicker et al. | |
| 2005/0096873 A1 * | 5/2005 | Klein | G01M 13/028 |
| | | | 702/184 |
| 2006/0186880 A1 | 8/2006 | Schlicker et al. | |
| 2014/0163717 A1 | 6/2014 | Das et al. | |
| 2014/0189851 A1 * | 7/2014 | Domke | H04L 63/102 |
| | | | 726/17 |
| 2014/0207862 A1 | 7/2014 | Domke et al. | |
| 2014/0207874 A1 | 7/2014 | Soorianarayanan et al. | |
| 2014/0207875 A1 | 7/2014 | Messinger et al. | |
| 2014/0208159 A1 | 7/2014 | Soorianarayanan et al. | |
| 2014/0208163 A1 | 7/2014 | Domke et al. | |
| 2015/0283654 A1 | 10/2015 | Ernest et al. | |
| 2016/0018292 A1 * | 1/2016 | DeAscanis | G01M 15/02 |
| | | | 73/112.01 |
| 2016/0110243 A1 | 4/2016 | Domke et al. | |
| 2017/0011503 A1 * | 1/2017 | Newman | G06K 9/00637 |
| 2018/0003161 A1 * | 1/2018 | Michini | F03D 17/00 |
| 2019/0195084 A1 * | 6/2019 | Lipstein | G01B 11/14 |

FOREIGN PATENT DOCUMENTS

| | | |
|---|---|---|
| EP | 2 733 307 A1 | 5/2014 |
| EP | 2 949 580 A1 | 12/2015 |
| JP | H03-49870 A | 3/1991 |
| JP | 2618886 B2 | 6/1997 |
| JP | 3404570 B2 | 5/2003 |
| WO | 2014074947 A2 | 5/2014 |
| WO | 2014074947 A9 | 5/2014 |
| WO | 2014116358 A2 | 7/2014 |
| WO | 2014116406 A2 | 7/2014 |
| WO | 2014116410 A2 | 7/2014 |
| WO | 2014116423 A2 | 7/2014 |

* cited by examiner

SYSTEMS AND METHODS FOR INSPECTING, CLEANING, AND/OR REPAIRING ONE OR MORE BLADES ATTACHED TO A ROTOR OF A GAS TURBINE ENGINE USING A ROBOTIC SYSTEM

CROSS-REFERENCE TO RELATED APPLICATIONS

The disclosure claims priority to and the benefit of U.S. provisional application No. 62/655,664, filed Apr. 10, 2018, which is incorporated by reference herein in its entirety.

FIELD OF THE DISCLOSURE

The disclosure relates generally to gas turbine engines and more particularly relates to systems and methods for inspecting, cleaning, and/or repairing one or more blades attached to a rotor of a gas turbine engine using a robotic system.

BACKGROUND

Blades in a gas turbine engine, such as the blades in a compressor or turbine, may be periodically inspected, cleaned, and repaired by hand. This process may be time consuming, labor intensive, and possibly hazardous. For example, due to the geometry and sharp edges of the blades, the laborers may wear steel mesh gloves up to their elbows, which may make the inspection, cleaning, and repair process even more difficult and time consuming. Moreover, the inspection, surface finish, and repair of each blade may be inconsistent due to human imprecision.

BRIEF DESCRIPTION

Some or all of the above needs and/or problems may be addressed by certain embodiments of the disclosure. According to an embodiment, there is disclosed a system for inspecting, cleaning, and/or repairing one or more blades attached to a rotor of a gas turbine engine. The system may include a track disposed adjacent to the rotor, a mechanical arm moveable along the track, a number of tools attachable to the mechanical arm, and a controller configured to control a position of at least one of the tools that is attached to the mechanical arm about the one or more blades.

According to another embodiment, there is disclosed a method for inspecting, cleaning, and/or repairing one or more blades attached to a rotor of a gas turbine engine. The method may include positioning a track adjacent to the rotor, moving a mechanical arm along the track, attaching at least one of a number of tools to the mechanical arm, and controlling a position of the tool about the one or more blades.

Further, according to another embodiment, there is disclosed a system for inspecting, cleaning, and/or repairing one or more blades attached to a rotor of a gas turbine engine. The system may include a track disposed adjacent to the rotor, a robotic arm moveable along the track, a number of tools configured to be stored on a tool docking station and attachable to an end of the robotic arm, and a controller configured to control a position of at least one of the tools attached to the robotic arm about the one or more blades.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
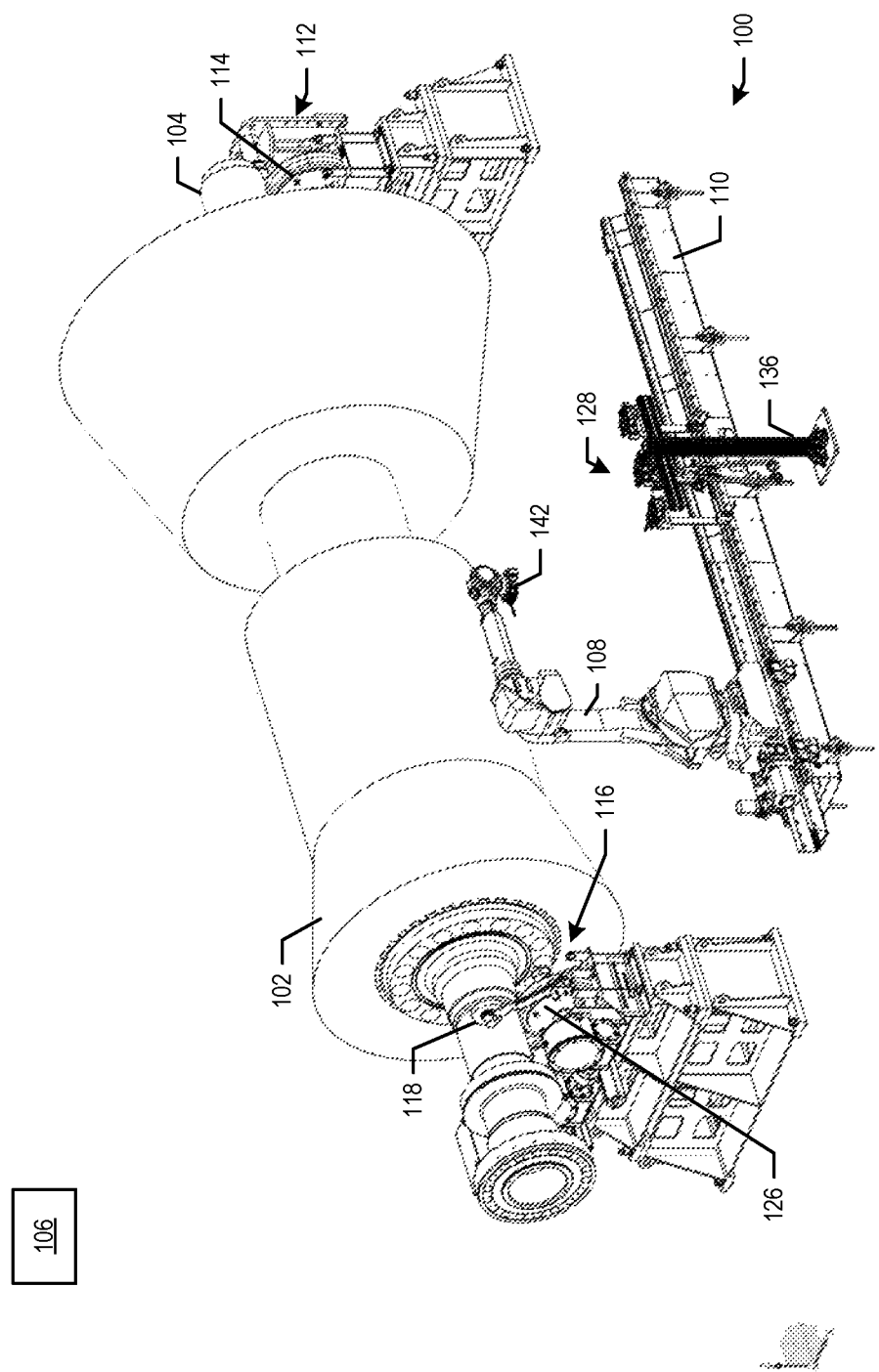
FIG. 1 depicts an exemplary system for inspecting, cleaning, and/or repairing one or more blades attached to a rotor of a gas turbine engine, according to an embodiment.

Illustrative embodiments will now be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

The systems and methods described herein may be used to inspect, clean, and/or repair one or more blades attached to a rotor of a turbomachine. In some instances, the blades may be disposed in a compressor or a turbine. Any device with blades may utilize the systems and methods disclosed herein to inspect, clean, and/or repair the blades. The rotor may also be inspected, cleaned, and/or repaired by the system. In some instances, the turbomachine may be a gas turbine engine. Any industrial turbomachine may be used.

In certain embodiments, an automated robotic system 100 may be used to inspect, clean, and/or repair one or more blades 102 attached to a rotor 104. The various components of the system 100 may be in communication with at least one controller 106 to control the movement of the components. The components may be hardwired to the controller 106 or in wireless communication with the controller 106. The controller 106 may be any suitable computing device having a memory and a processor. The controller 106 may be separate from the components of the system 100, or the controller 106 may be incorporated into one or more of the components of the system 100. In some instances, a number of controllers 106 may communicate with one another over a network to control the various components of the robotic system disclosed herein.

Figure 2:
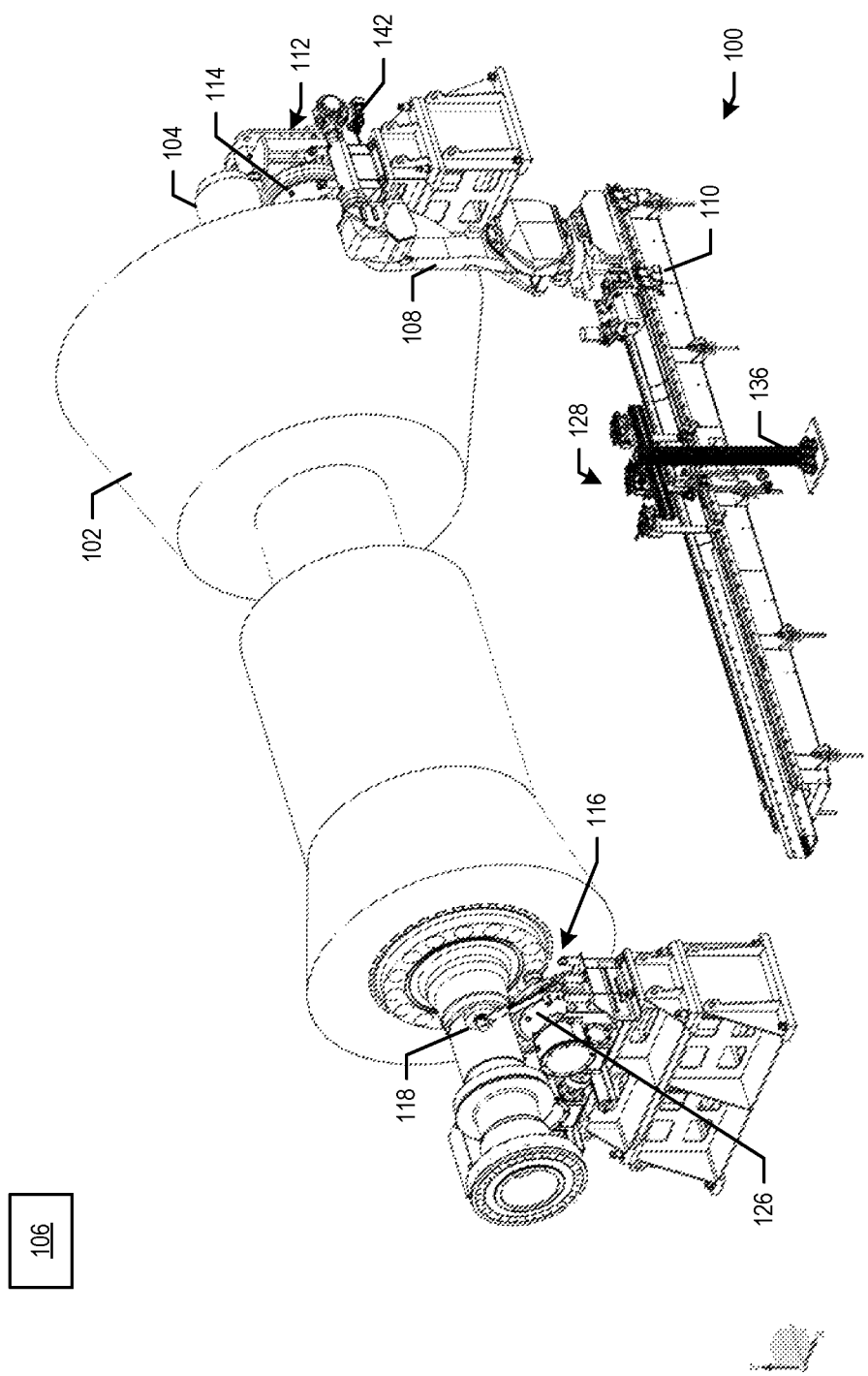
FIG. 2 depicts an exemplary system for inspecting, cleaning, and/or repairing one or more blades attached to a rotor of a gas turbine engine, according to an embodiment.

The system 100 may include a mechanical arm (e.g., a robotic arm 108) disposed on a track 110. In some instances, the robotic arm 108 may be a 6-axis robotic arm. The robotic arm 108 may be any suitable size, shape, or configuration. The track 110 may be disposed adjacent to the rotor 104. In some instances, the track 110 may be parallel with and run along all or part of the axial length of the rotor 104. The track 110 may be any suitable size, shape, or configuration. As depicted in FIGS. 1 and 2, the robotic arm 108 may move along the track 110 from end to end via one or more actuators to different axial locations along the rotor 104. In this manner, the track 110 may function as a 7th axis of the robotic arm 108.

A rotational actuator 112 may be in mechanical communication with the rotor 104. In some instances, the rotational actuator 112 may comprise power rollers 114 in mechanical communication with the rotor 104. The rotational actuator 112 may be configured to rotate the rotor 104 to move the blades 102 attached thereto. In this manner, the rotational actuator 112 may be in communication with the controller 106. The controller 106 may enable the robotic arm 108 to access one or more of the blades 102 attached to the rotor 104 by rotating the rotor 104 via the rotational actuator 112 and moving the robotic arm 108 along the track 110. Once the rotor 104 has been rotated into position and the robotic arm 108 moved into position along the track 110, the robotic arm 108 may move about its various axes to inspect, clean, and/or repair the blades 102 with one or more tools.

Figure 3:
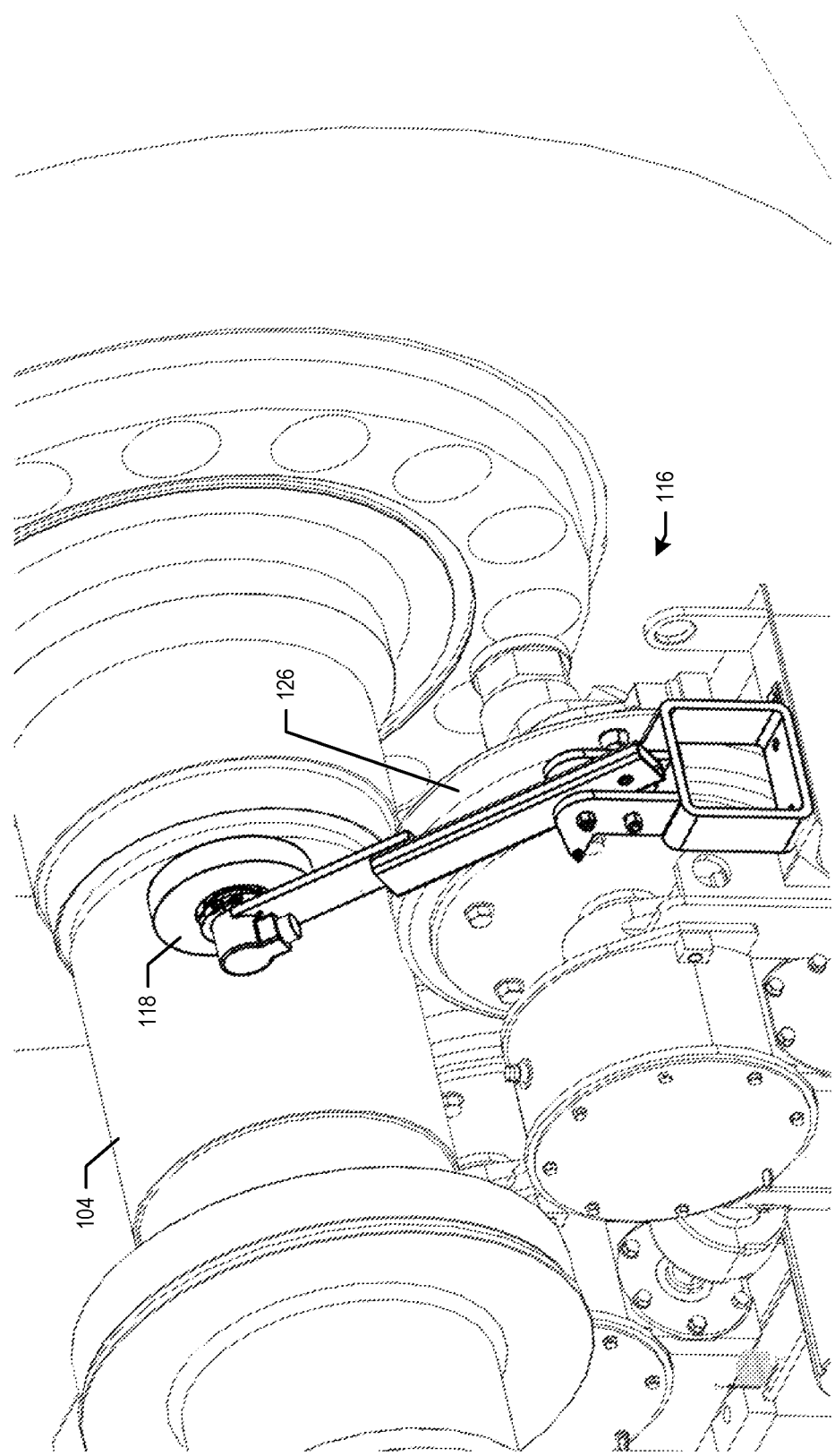
FIG. 3 depicts a portion of an exemplary system for inspecting, cleaning, and/or repairing one or more blades attached to a rotor of a gas turbine engine, according to an embodiment.

In order to determine the position of the blades 102, a rotational sensor 116 may be disposed adjacent to the rotor 104, as depicted in FIGS. 1-3. The rotational sensor 116 may be configured to provide annular positional data associated with the rotor 104. In this manner, the rotational sensor 116 may be in communication with the controller 106. In some instances, the rotational sensor 116 may include an encoder wheel 118 in mechanical communication with the rotor 104. The rotational sensor 116 may be any suitable size, shape, or configuration. The rotor 104 may be disposed on one or more roller stands 126.

Figure 4:
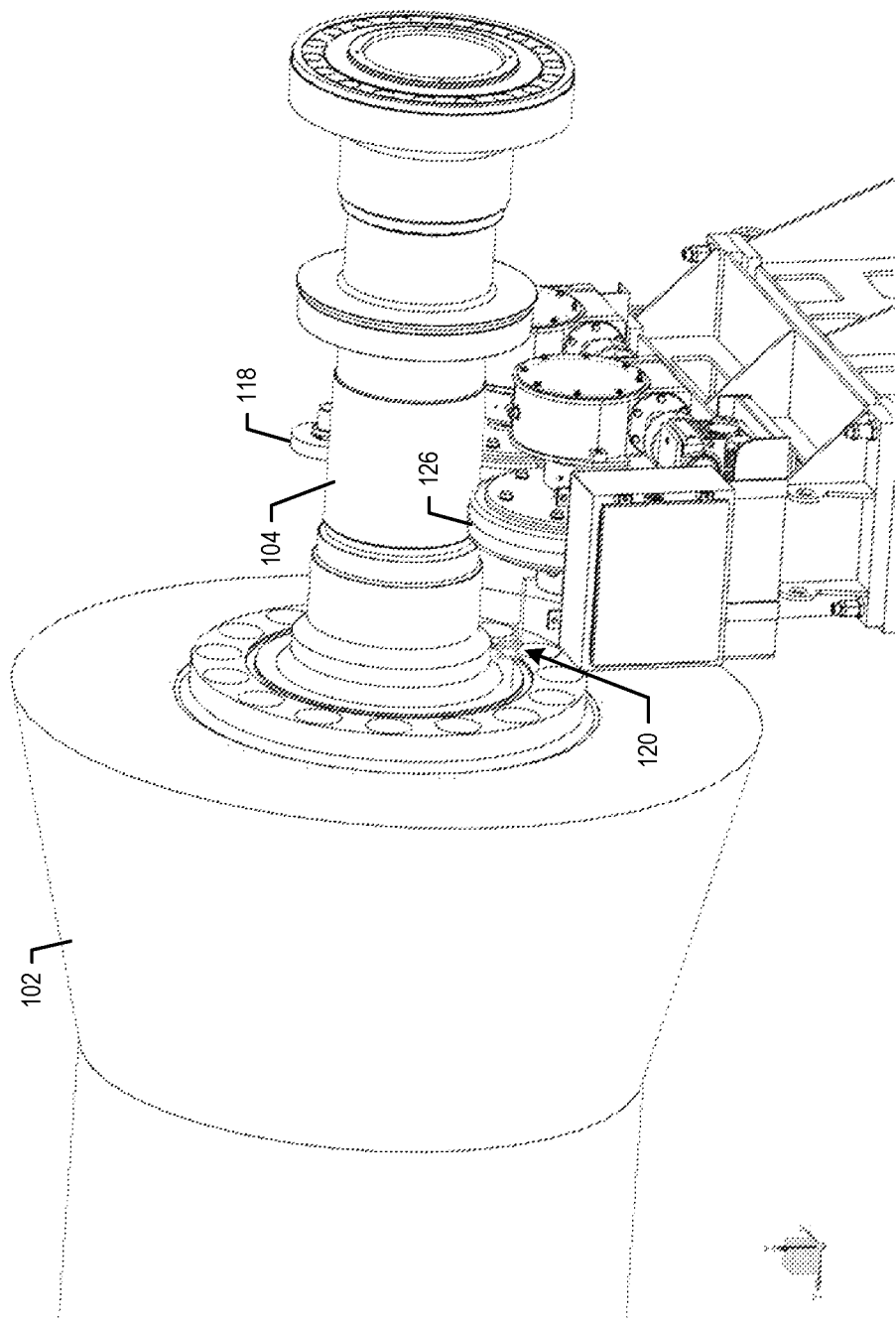
FIG. 4 depicts a portion of an exemplary system for inspecting, cleaning, and/or repairing one or more blades attached to a rotor of a gas turbine engine, according to an embodiment.
Figure 5:
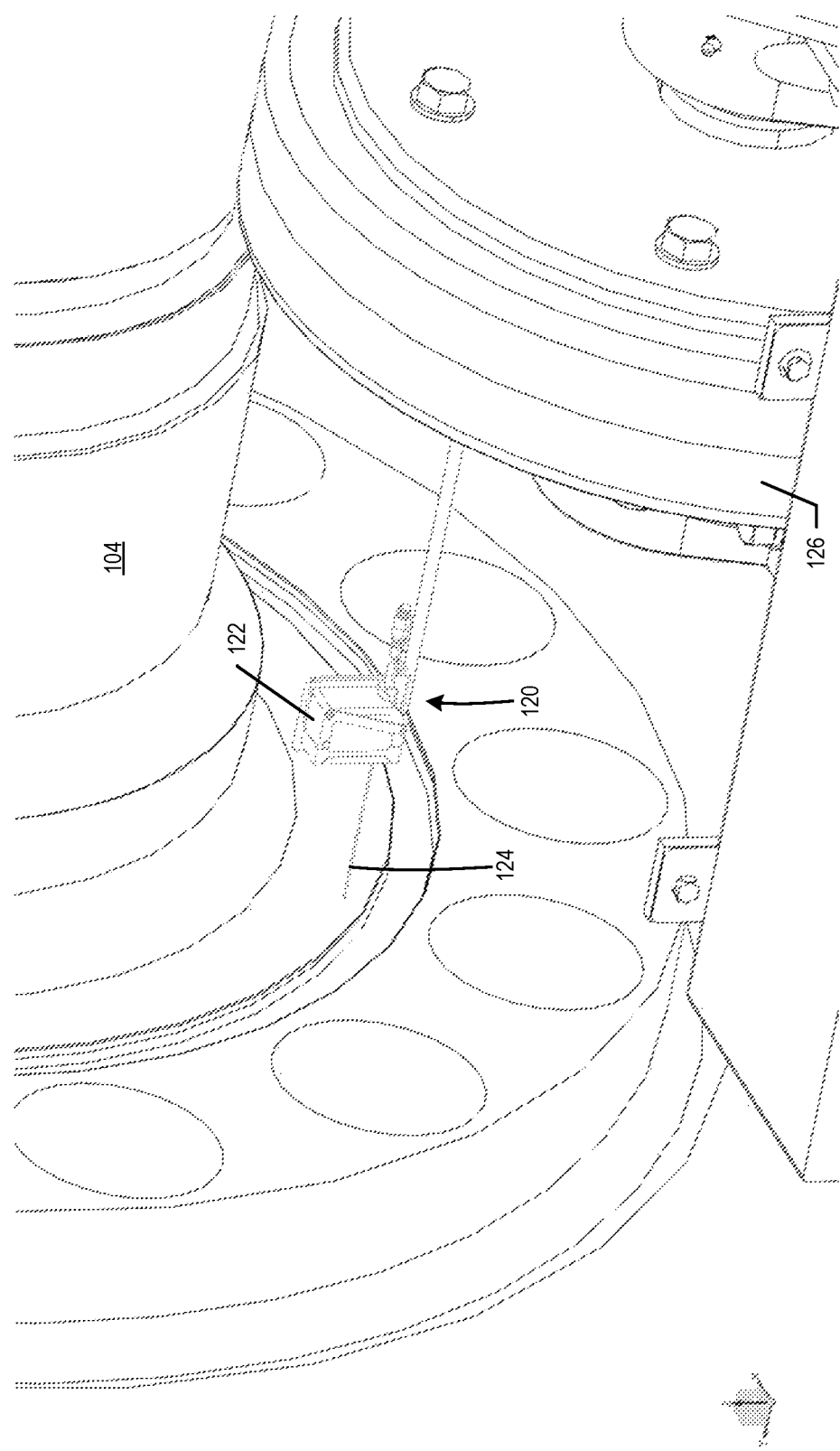
FIG. 5 depicts a portion of an exemplary system for inspecting, cleaning, and/or repairing one or more blades attached to a rotor of a gas turbine engine, according to an embodiment.

As depicted in FIGS. 4 and 5, an axial movement sensor 120 may be disposed adjacent to the rotor 104. The axial movement sensor 120 may be configured to provide axial positional data associated with the rotor 104. In this manner, the axial movement sensor 120 may be in communication with the controller 106. In some instances, the axial movement sensor 120 may be an axial laser sensor 122. The axial laser sensor 122 may use a laser 124 to track the movement of the rotor 104 parallel to the axis of rotation of the rotor 104. For example, misalignment of the roller stands 126 may cause the rotor 104 to "walk" in either axial direction. Tracking the axial movement is desirable for offsetting the robotic programs.

Figure 6:
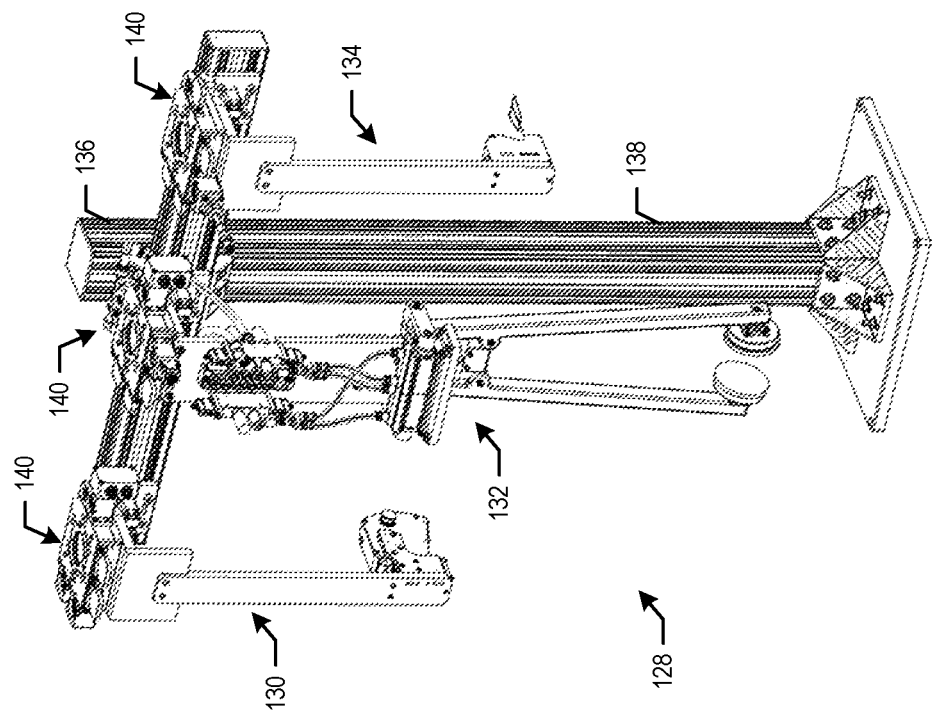
FIG. 6 depicts a portion of an exemplary system for inspecting, cleaning, and/or repairing one or more blades attached to a rotor of a gas turbine engine, according to an embodiment.

As depicted in FIGS. 1, 2, and 6, the system 100 may include a number of tools 128 attachable to the robotic arm 108. In some instances, as discussed in greater detail below, the tools 128 may include a vision tool 130, a cleaning tool 132, and a scanning tool 134. Any number or type of tools 128 may be used. In some instances, the tools 128 may be stored on a docketing station 136. The docking station 136 may be located adjacent to the track 110 so that the tools can be accessed by the robotic arm 108. In some instances, the docking station 136 may include a T-stand 138 that includes a number of docks 140 for storing the tools 128 when not in use.

An end 142 of the robotic arm 108 may include a coupling configured to be attached to at least one of the tools 128. For example, each of the tools 128 may include a base that is attachable to the end 142 of the robotic arm 108. The bases of each of the tools 128 may be uniform to facilitate rapid exchange of tools. In this manner, the robotic arm 108 may be moved along the track 110 and attached to one of the tools 128 on the docking station 136 in order to remove the tool 128 from the docking station 136. The controller 106 may be in communication with the tool 128 such that the tool 128 at the end 142 of the robotic arm 108 may be used to inspect, clean, and/or repair the blades 102. In other instances, after the tool 128 has been used, the tool 128 may be re-docked on the docking station 136. For example, the robotic arm 108 may be moved along the track 110 and positioned adjacent to the docking station 136, at which point the tool 128 may be re-dock into one of the docks 140 on the docking station 136.

Figure 7:
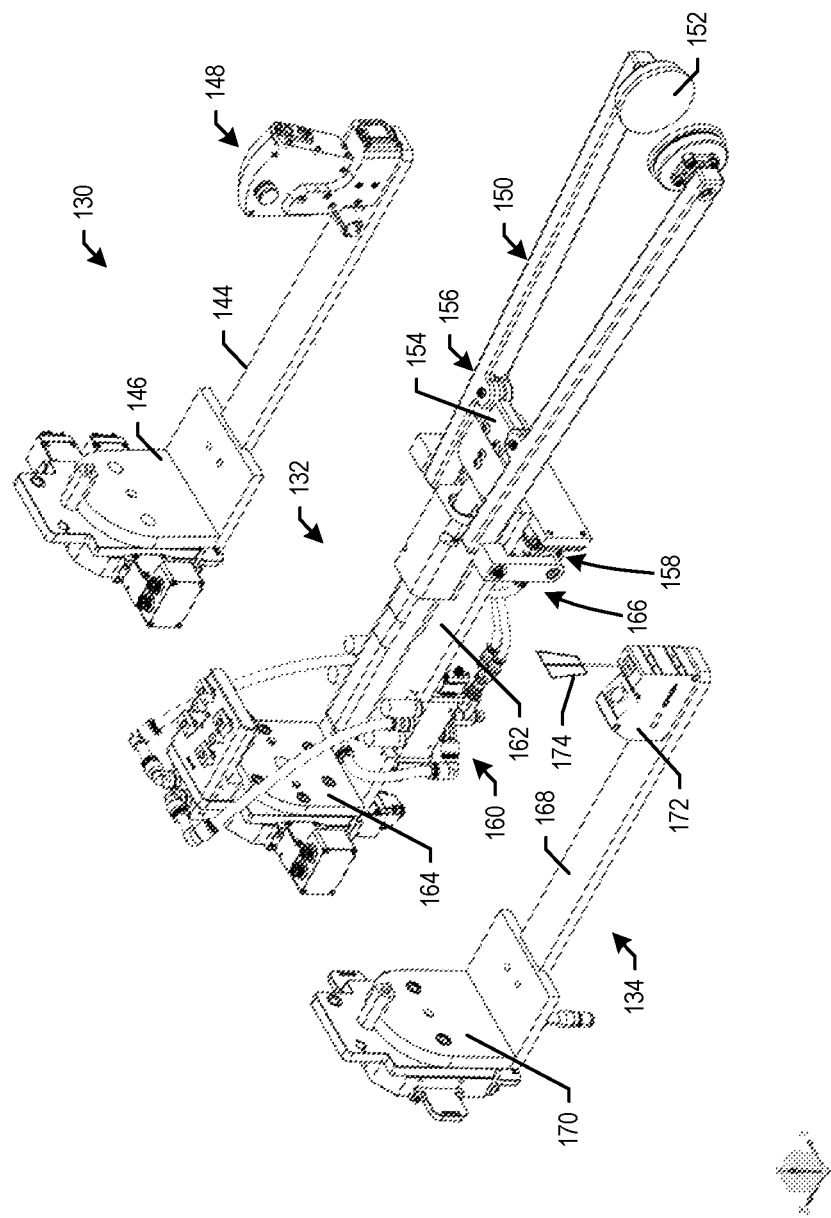
FIG. 7 depicts a portion of an exemplary system for inspecting, cleaning, and/or repairing one or more blades attached to a rotor of a gas turbine engine, according to an embodiment.

As depicted in FIG. 7, the vision tool 130 may include a bracket 144 that extends outward from a base 146. The base 146 (i.e., tool changer) may be configured to be attached to the end 142 of the robotic arm 108. In some instances, an optical device 148, such as a 3D camera and laser, may be mounted on the end of the bracket 144. In certain embodiments, the optical device 148 can snap photos and use contrast with sharp edges to find and locate shapes/objects, while the laser can identify the shapes, orientation, and angle of the blades 102. The robotic arm 108 may use the vision tool 130 to locate vision fixtures (markers) positioned on the rotor 104 to find the blade clocking positions at all stages. Once the blade positions have been found, the robotic arm 108 can then offset the previously taught positions to begin the cleaning/scanning processes.

The cleaning tool 132 may include a mechanical end effector that can be maneuvered by the robotic arm 108 to clean the blades 102. The cleaning tool 132 may be similar to the cleaning tool disclosed in U.S. application Ser. No. 15/422,513, filed Feb. 2, 2017, which is incorporated by reference herein in its entirety. In some instances, the cleaning tool 132 may include two elongated arms 150 with pads 152 attached to the ends thereof. The arms 150 may be attached to a mounting block 154 via a pivot 156. The arms 150 can be opened and closed by an actuator 158 connected to an I/O block 160, which can be controlled by the controller 106. A plate 162 is mounted to a base 164. The base 164 (i.e., tool changer) is configured to be attached to the end 142 of the robotic arm 108. The I/O block 160 and a pneumatic oscillating tool 166 may be mounted to the plate 162. The oscillating tool 166 may be turned on or off by the robotic arm 108 (i.e., the controller 106) via the I/O block 160. When the robotic arm 108 positions the pads 152 over a blade 102, the arms 150 may be closed and the oscillating tool 166 may be activated via the controller 106. The robotic arm 108 may then move up and down the blade 102, covering all surfaces until the blade 102 is clean of debris. This process may be completed on all blades 102 after the system 100 finds the blade positions with the vision tool 130.

The scanning tool 134 may be used by the robotic arm 108 to identify and locate blade defects. The scanning tool 134 may include an elongated plate 168 that is mounted to a base 170. The base 170 (i.e., tool changer) is configured to be attached to the end 142 of the robotic arm 108. In some instances, a scanner 172 (e.g., a line scanner) may be mounted at the end of the plate 168. The robotic arm 108 may be configured to move the scanner 172 along the blade 102. The scanner 172 may be configured to use a laser 174 to map out the blade surface. Any anomalies found during scanning may output the center location and size of a defect, as well as the blade number and stage to identify the blade location on the rotor 104. The detected defects can include surface dents, edge defects, and cracks on the blade 102. This process may be completed after cleaning the rotor 104 and/or blades 102, and may be performed on all blades 102. The defects can be modeled in a software program or the like in order to provide recommendations and/or visualizations for repairing the blades and/or to be used with a repair tool to repair the blades 102. In some instances, the defects may be compared to baseline models of the blades. A post blending inspection may be conducted using the scanner 172 to get the as blended condition of the blade and/or rotor.

Figure 8:
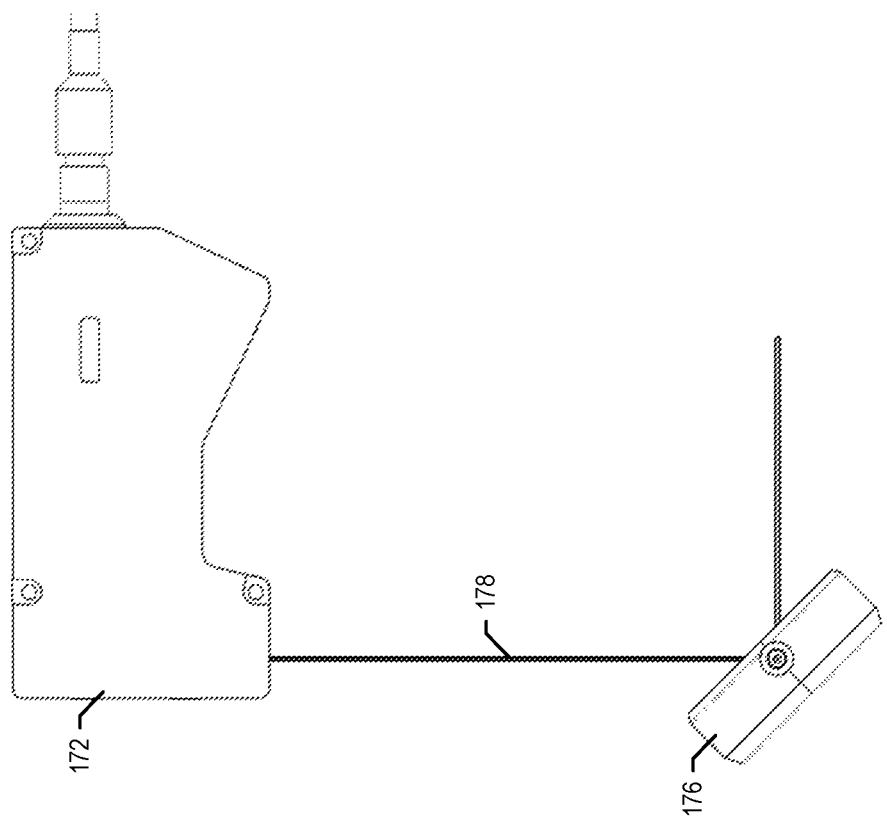
FIG. 8 depicts a portion of an exemplary system for inspecting, cleaning, and/or repairing one or more blades attached to a rotor of a gas turbine engine, according to an embodiment.

In some instances, as depicted in FIG. 8, the scanning tool 134 may include a mirror 176 for directing the laser 178 into tight spaces. That is, the mirror 176 may be configured to fit into tight spaces between the blades 102, which may enable the sensor package to go places it could not on its own and still transmit data with proper fidelity.

Figure 9:
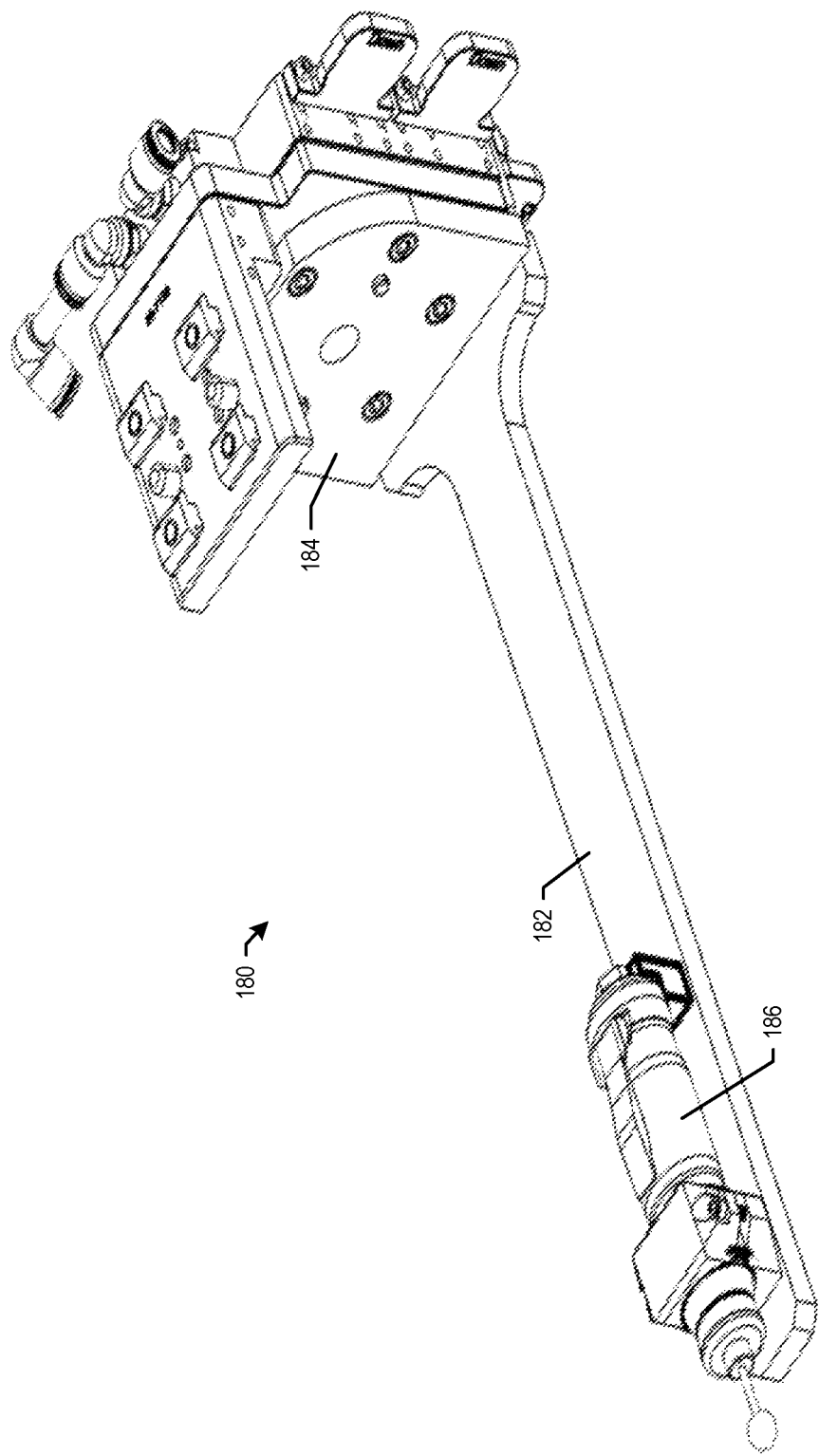
FIG. 9 depicts a portion of an exemplary system for inspecting, cleaning, and/or repairing one or more blades attached to a rotor of a gas turbine engine, according to an embodiment.

FIG. 9 depicts a repair tool 180 that may be attached to and used by the robotic arm 108 to repair one or more blade defects. In certain embodiments, the repair tool 180 may be a blending tool or the like. In some instances, the repair tool 180 may be docked on the docking station 136. The repair tool 180 may include an elongated plate 182 that is mounted to a base 184. The base 184 (i.e., tool changer) is configured to be attached to the end 142 of the robotic arm 108. In some instances, a rotary tool 186 (e.g., a pneumatic rotary tool with a stone or burr bit) may be mounted at the end of the elongated plate 182. Any suitable repair tool may be used herein. The rotary tool 186 may be in line with the elongated plate 182 or at a 90 degree angle. The rotary tool 186 may be disposed at any suitable angle relative to the elongated plate 182. The robotic arm 108 may be configured to move the rotary tool 186 along the blade 102. The rotary tool 186 may be configured to use repair (e.g., blend) one or more defects on the blade surface.

In use, the controller 106 (or a number of controllers in communication with one another via a network) may control the movement of the various components of the system 100. For example, the rotational actuator 112 may move the rotor 104 in order to position the blades 102 in a desired location and orientation. The robotic arm 108 may move along the track 110 and attach to one of the tools 128 stored on the docking station 136. In some instances, the robotic arm 108 may be attached to the vision tool 130. The vision tool 130 may be moved about each of the blades 102 by the robotic arm 108 in order to confirm the location of the blades 102. Next, the robotic arm 108 may re-dock the vision tool 130 at the docking station 136 and attach to the cleaning tool 132. The robotic arm 108 may maneuver the cleaning tool 132 about each of the blades 102 in order to clean the blades 102. Next, the robotic arm 108 may re-dock the cleaning tool 132 at the docking station 136 and attach to the scanning tool 134. The robotic arm 108 may maneuver the scanning tool 134 about each of the blades 102 in order to digitally map the blades 102 to detect defects in the blades 102. Additional tools 128 (e.g., the repair tool 180) may be stored on the docking station 136 and may be used by the robotic arm 108 to correct/repair the defects.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
    a track disposed adjacent to a rotor having one or more blades attached thereto;
    a mechanical arm moveable along the track;
    a plurality of tools attachable to the mechanical arm; and
    a controller configured to control a position of at least one of the plurality of tools attached to the mechanical arm about the one or more blades.

2. The system of claim 1, further comprising a rotational sensor disposed adjacent to the rotor, wherein the rotational sensor is configured to provide annular positional data associated with the rotor.

3. The system of claim 2, wherein the rotational sensor comprises an encoder wheel in mechanical communication with the rotor.

4. The system of claim 1, further comprising an axial movement sensor disposed adjacent to the rotor, wherein the axial movement sensor is configured to provide axial positional data associated with the rotor.

5. The system of claim 4, wherein axial movement sensor comprises a laser distance sensor.

6. The system of claim 1, further comprising a rotational actuator in mechanical communication with the rotor.

7. The system of claim 1, further comprising a tool docking station disposed adjacent to the track.

8. The system of claim 1, wherein the mechanical arm comprises a robotic arm.

9. The system of claim 1, wherein the mechanical arm comprises a coupling at an end thereof configured to be attached to at least one of the plurality of tools.

10. The system of claim 9, wherein each of the plurality of tools comprise a base attachable to the coupling at the end of the mechanical arm.

11. The system of claim 1, wherein the plurality of tools comprise a vision tool, a cleaning tool, and a scanning tool.

12. A method, comprising:
    positioning a track adjacent to a rotor having one or more blades attached thereto;
    moving a mechanical arm along the track;
    attaching at least one of a plurality of tools to the mechanical arm; and
    controlling a position of the at least one of the plurality of tools about the one or more blades.

13. The method of claim 12, further comprising determining annular positional data associated with the rotor.

14. The method of claim 12, further comprising determining axial positional data associated with the rotor.

15. The method of claim 12, further comprising rotating the rotor with a rotational actuator in mechanical communication with the rotor.

16. The method of claim 12, further comprising positioning one or more of the plurality of tools on a tool docking station disposed adjacent to the track.

17. A system, comprising:
    a track disposed adjacent to a rotor having one or more blades attached thereto;
    a robotic arm moveable along the track;
    a plurality of tools configured to be stored on a tool docking station and attachable to an end of the robotic arm; and
    a controller configured to control a position of at least one of the plurality of tools attached to the robotic arm about the one or more blades.

18. The system of claim 17, further comprising a rotational sensor disposed adjacent to the rotor, wherein the rotational sensor is configured to provide annular positional data associated with the rotor.

19. The system of claim 1, further comprising an axial movement sensor disposed adjacent to the rotor, wherein the axial movement sensor is configured to provide axial positional data associated with the rotor.

20. The system of claim 1, further comprising a rotational actuator in mechanical communication with the rotor.

* * * * *